(12) United States Patent
Kadobayashi

(10) Patent No.: US 9,479,669 B2
(45) Date of Patent: Oct. 25, 2016

(54) IMAGE FORMING APPARATUS

(71) Applicant: KYOCERA Document Solutions Inc., Osaka (JP)

(72) Inventor: Mizue Kadobayashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/075,413

(22) Filed: Mar. 21, 2016

(65) Prior Publication Data
US 2016/0286071 A1    Sep. 29, 2016

(30) Foreign Application Priority Data

Mar. 26, 2015 (JP) .................... 2015-064991

(51) Int. Cl.
*H04N 1/04* (2006.01)
*H04N 1/193* (2006.01)
*H04N 1/00* (2006.01)

(52) U.S. Cl.
CPC .......... *H04N 1/193* (2013.01); *H04N 1/00037* (2013.01); *H04N 1/0044* (2013.01); *H04N 1/0071* (2013.01); *H04N 1/00411* (2013.01); *H04N 1/00713* (2013.01); *H04N 1/00771* (2013.01); *H04N 1/00777* (2013.01); *H04N 1/00795* (2013.01); *H04N 2201/0094* (2013.01)

(58) Field of Classification Search
CPC ............. H04N 1/193; H04N 1/00411; H04N 1/00037; H04N 1/0071; H04N 1/00713; H04N 1/00795; H04N 1/0044

USPC .................... 358/1.2, 1.9, 474, 483
See application file for complete search history.

(56) References Cited

U.S. PATENT DOCUMENTS

2010/0196041 A1* 8/2010 Otaki .................. G03G 15/502 399/81
2014/0118753 A1* 5/2014 Minakuchi ............. H04N 1/393 358/1.2

FOREIGN PATENT DOCUMENTS

JP       H09-090819 A    4/1997

* cited by examiner

*Primary Examiner* — Houshang Safaipour
(74) *Attorney, Agent, or Firm* — IP Business Solutions, LLC

(57) ABSTRACT

An image forming apparatus includes: a copy condition storage section configured to store a copy condition depending on a size of an original document to be copied, with the copy condition associated with at least a width of the original document along a main scanning direction; a document width detecting section configured to detect the document width; a copy condition readout section configured to read, from the copy condition storage section, the copy condition associated with the document width detected by the document width detecting section; an image forming section configured to form an image on a recording sheet; an image reading section configured to read the original document to acquire an image; and a control section configured to allow the image forming section to form the image acquired by the image reading section on the recording sheet according to the copy condition read by the copy condition readout section.

3 Claims, 13 Drawing Sheets

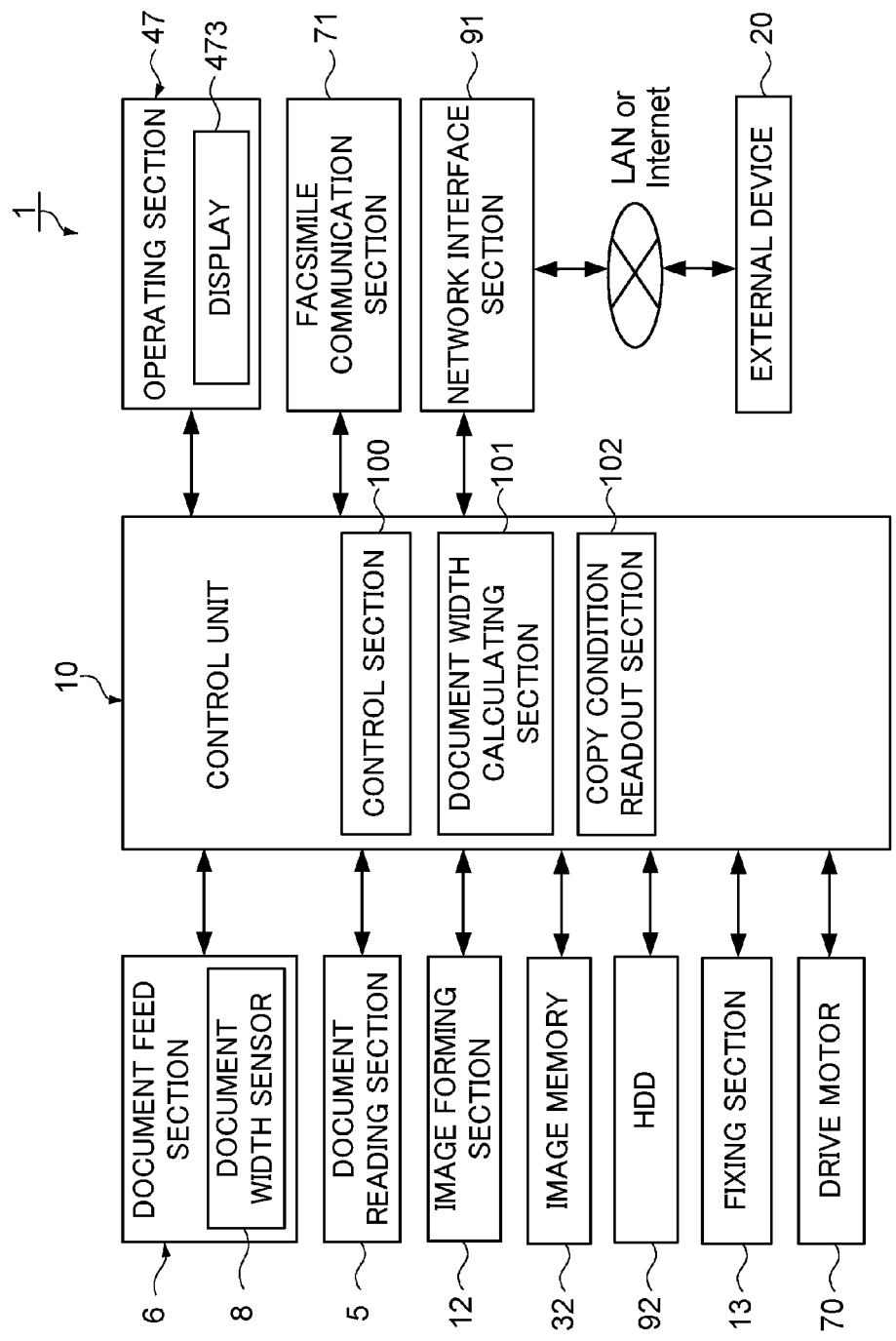

Fig.3A

| DOCUMENT WIDTH | | MODIFICATION | COPY CONDITIONS | | | |
|---|---|---|---|---|---|---|
| MINIMUM | MAXIMUM | 0 : NO<br>1 : YES | MAGN. | DENSITY | SHEETS | |
| 0mm | 210mm | 0 | 100% | NORMAL | A4 | |
| 211mm | 297mm | 0 | 100% | NORMAL | A3 | |
| 298mm | MORE<br>(NO LIMIT) | 0 | 60% | HIGH | A3 | |

| DOCUMENT WIDTH | | MODIFICATION | COPY CONDITIONS | | | |
|---|---|---|---|---|---|---|
| MINIMUM | MAXIMUM | 0 : NO<br>1 : YES | MAGN. | DENSITY | SHEETS | |
| 0mm | 210mm | 0 | 100% | NORMAL | A4 | |
| 211mm | 249mm | 1 | 100% | NORMAL | A3 | |
| 321mm | MORE<br>(NO LIMIT) | 1 | 60% | HIGH | A3 | |
| 250mm | 320mm | 1 | 66% | LOW | A4 | |

COPY CONDITION SETTING SCREEN

DOCUMENT WIDTH
(RANGE SPECIFICATION)

| | | |
|---|---|---|
| MIN. | 250 | mm |
| MAX. | 320 | mm |

COPY CONDITIONS

| | |
|---|---|
| MAGN. | 66% |
| DENSITY | LOW |
| SHEETS | A4 |

OK    CANCEL

COPY CONDITION SETTING SCREEN

DOCUMENT WIDTH
(RANGE SPECIFICATION)

| | | |
|---|---|---|
| MIN. | 250 | mm |
| MAX. | 320 | mm |

COPY CONDITIONS

| | |
|---|---|
| MAGN. | 66% |
| DENSITY | LOW |
| SHEETS | A4 |

DOCUMENT LENGTH
(RANGE SPECIFICATION)

| | | |
|---|---|---|
| MIN. | 260 | mm |
| MAX. | 300 | mm |

OK    CANCEL

D2

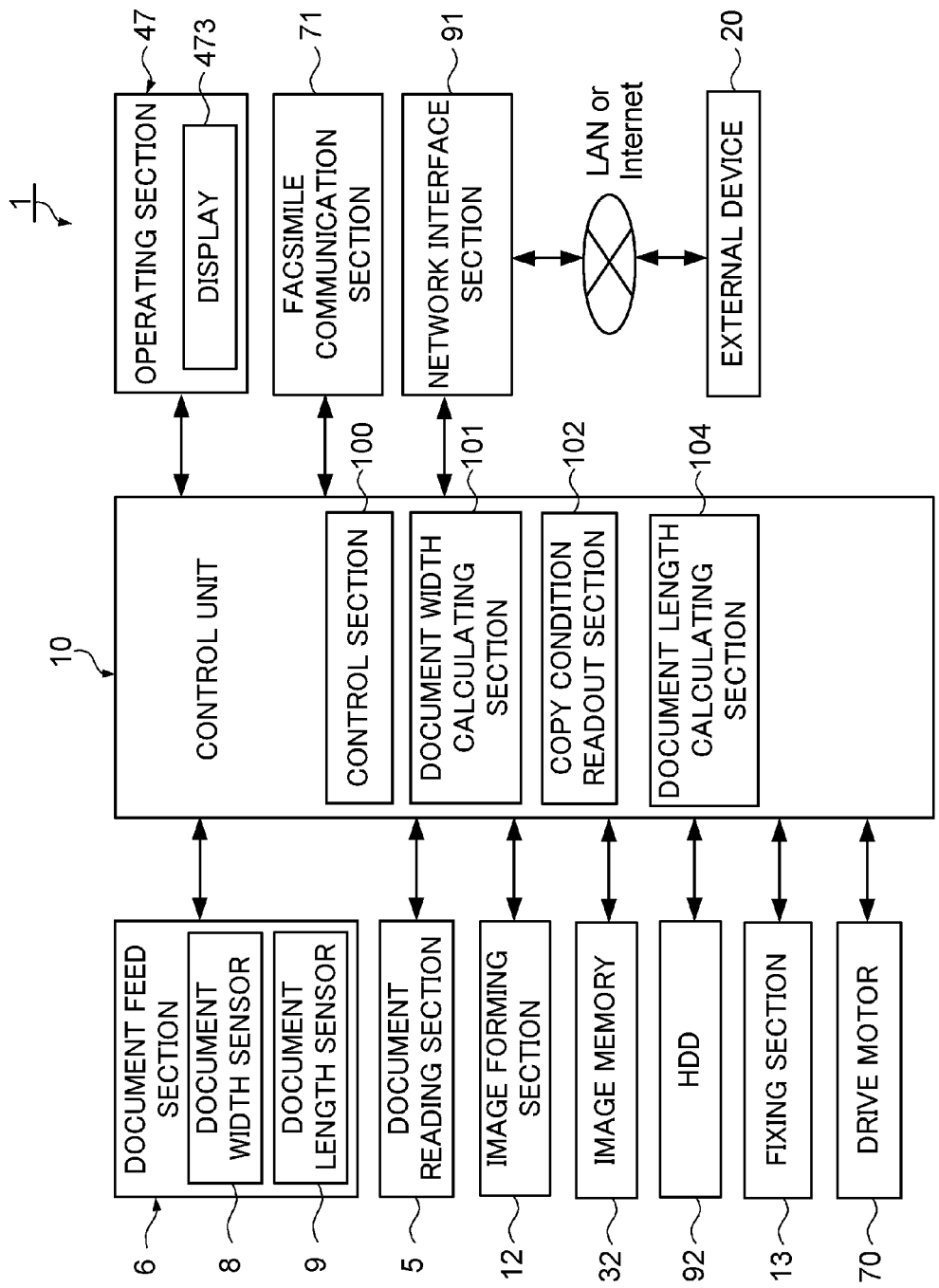

Fig.8A

| DOCUMENT SIZE | | | | MODIFICATION | COPY CONDITIONS | | |
|---|---|---|---|---|---|---|---|
| DOCUMENT WIDTH | | DOCUMENT LENGTH | | 0 : NO<br>1 : YES | MAGN. | DENSITY | SHEETS |
| MINIMUM | MAXIMUM | MINIMUM | MAXIMUM | | | | |
| 0mm | 210mm | 0mm | 200mm | 0 | 80% | NORMAL | A4 |
| 0mm | 210mm | 201mm | 297mm | 0 | 100% | NORMAL | A4 |
| 211mm | 297mm | 300mm | 420mm | 0 | 80% | NORMAL | A3 |
| 211mm | 297mm | 0mm | 299mm | 0 | 100% | NORMAL | A3 |
| 298mm | MORE<br>(NO LIMIT) | 0mm | 300mm | 0 | 50% | HIGH | A3 |
| 298mm | MORE<br>(NO LIMIT) | 301mm | 420mm | 0 | 60% | HIGH | A3 |

| DOCUMENT SIZE | | | | MODIFICATION | COPY CONDITIONS | | |
|---|---|---|---|---|---|---|---|
| DOCUMENT WIDTH | | DOCUMENT LENGTH | | 0:NO 1:YES | MAGN. | DENSITY | SHEETS |
| MINIMUM | MAXIMUM | MINIMUM | MAXIMUM | | | | |
| 0mm | 210mm | 0mm | 200mm | 0 | 80% | NORMAL | A4 |
| 0mm | 210mm | 201mm | 297mm | 0 | 100% | NORMAL | A4 |
| 211mm | 297mm | 300mm | 420mm | 0 | 80% | NORMAL | A3 |
| 211mm | 249mm | 0mm | 299mm | 1 | 100% | NORMAL | A3 |
| 298mm | MORE (NO LIMIT) | 381mm | 420mm | 0 | 50% | HIGH | A3 |
| 298mm | MORE (NO LIMIT) | 0mm | 380mm | 1 | 60% | HIGH | A3 |

DB4

IMAGE FORMING APPARATUS

INCORPORATION BY REFERENCE

This application claims priority to Japanese Patent Application No. 2015-64991 filed on Mar. 26, 2015, the entire contents of which are incorporated by reference herein.

BACKGROUND

The present disclosure relates to image forming apparatuses having a copy function or document reading apparatuses having a document reading function.

Image forming apparatuses having a copy function are capable of previously setting print setting items, including magnification, density, and sheet size. There is also known an image forming apparatus capable of previously setting print setting items, such as magnification, density, and sheet size, for each size of original document and performing, during copying of an original document, image reading and image formation according to the print setting items set for each standard size of original document detected by a document size detecting section. Specifically, in this image forming apparatus, copy conditions are previously set in association with each standard document size, such as A3 or A4. In copying an original document, the document size of the original document is detected by a document size detecting section and the original document is copied according to the copy conditions depending on the detected document size.

SUMMARY

A technique improved over the aforementioned technique is proposed as one aspect of the present disclosure.

An image forming apparatus according to an aspect of the present disclosure includes a copy condition storage section, a document width detecting section, a copy condition readout section, an image forming section, an image reading section, and a control section.

The copy condition storage section is configured to store a copy condition depending on a size of an original document to be copied, with the copy condition associated with at least a document width of the original document along a main scanning direction of the original document.

The document width detecting section is configured to detect the document width of the original document to be copied along the main scanning direction of the original document to be copied.

The copy condition readout section is configured to read out, from the copy condition storage section, the copy condition associated with the document width detected by the document width detecting section.

The image forming section is configured to form an image on a recording paper sheet.

The image reading section is configured to read the original document to be copied, thus acquiring an image of the original document.

The control section is configured to allow the image forming section to form the image acquired by the image reading section on the recording paper sheet according to the copy condition read out by the copy condition readout section.

A document reading apparatus according to another aspect of the present disclosure includes a document reading condition storage section, a document width detecting section, a document reading condition readout section, a document reading section, and a control section.

The document reading condition storage section is configured to store a document reading condition depending on a size of an original document to be read, with the document reading condition associated with at least a document width of the original document along a main scanning direction of the original document.

The document width detecting section is configured to detect the document width of the original document to be read along the main scanning direction of the original document to be read.

The document reading condition readout section is configured to read out, from the document reading condition storage section, the document reading condition associated with the document width detected by the document width detecting section.

The document reading section is configured to read the original document to be read, thus acquiring an image of the original document.

The control section is configured to allow the document reading section to read the original document according to the document reading condition read out by the document reading condition readout section.

BRIEF DESCRIPTION OF THE DRAWINGS

FIG. 2 is a functional block diagram schematically showing an essential internal configuration of the image forming apparatus according to the first embodiment of the present disclosure.

FIGS. 3A and 3B are tables showing examples of a data structure of a copy condition database.

FIGS. 4A and 4B are views showing examples of operating screens.

FIG. 7 is a functional block diagram schematically showing an essential internal configuration of the image forming apparatus according to the second embodiment of the present disclosure.

FIGS. 8A and 8B are tables showing examples of a data structure of another copy condition database.

DETAILED DESCRIPTION

Figure 1:
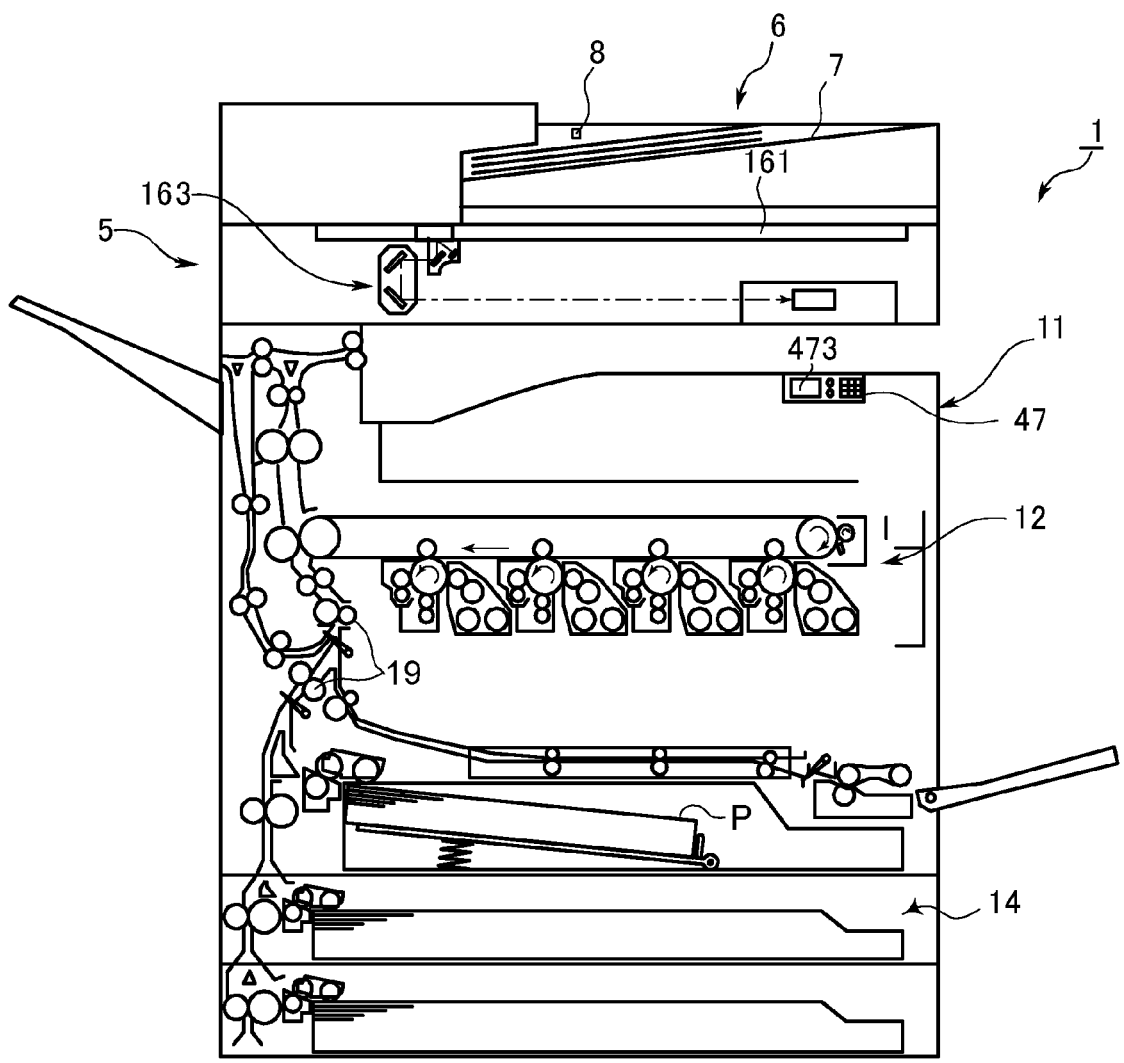
FIG. 1 is a schematic, partial cross-sectional front view showing the structure of an image forming apparatus according to a first embodiment of the present disclosure.

Hereinafter, a description will be given of an image forming apparatus and a document reading apparatus according to embodiments of the present disclosure, with reference to the drawings. FIG. 1 is a schematic, partial cross-sectional front view showing the structure of an image forming apparatus according to a first embodiment of the present disclosure.

The image forming apparatus 1 according to the first embodiment of the present disclosure is a multifunction peripheral having multiple functions including, for example, a copy function, a print function, a scan function, and a facsimile function. The image forming apparatus 1 is made up so that an apparatus body 11 thereof includes an operating section 47, a document feed section 6, and a document reading section 5.

The document feed section 6 includes a document width sensor 8. The document width sensor 8 includes a document guide (not shown) for aligning the width positions of original documents on a document loading table 7 with each other. The document guide is a side-to-side positioning member which is slidable in the main scanning direction on the document loading table 7 and is configured to slide to hold the original documents from both sides in the main scanning direction and thus keep the original documents placed on the document loading table 7 together. The position of the document guide in the main scanning direction on the document loading table 7 can be detected by a sensor or the like. The document guide and the sensor constitute the document width sensor 8 configured to detect the dimension (document width) of the original document along the main scanning direction.

The operating section 47 is configured to accept operator's instructions for various types of operations and processing executable by the image forming apparatus 1, such as an instruction to perform an image forming operation and an instruction to perform a document reading operation, and includes a display 473 configured to display operation guidance and so on for the operator.

First, a description will be given of the case where the document reading operation is performed on the image forming apparatus 1. The document reading section 5 optically reads an image of an original document being fed by the document feed section 6 including the document loading table 7 or an image of an original document placed on an original glass plate 161 and generates image data. The image data generated by the document reading section 5 is stored on an internal HDD (hard disk drive), a network-connected computer or the like.

The document reading section 5 includes a reader 163 including a lighting part, a CCD (charge coupled device) sensor, and so on. The document reading section 5 is configured to read a document image from an original document by irradiating the original document with light using the lighting part and receiving the reflected light on the CCD sensor. Note that the direction perpendicular to the plane of the figure is the main scanning direction (intersecting with the direction in which an original document is to be read) and the left-to-right direction of the figure is a sub-scanning direction (in which the original document is to be read).

Next, a description will be given of the case where the image forming operation is performed on the image forming apparatus 1. An image forming section 12 forms a toner image on a paper sheet P serving as a recording paper sheet fed from a sheet feed section 14, based on image data generated by the document reading operation, image data stored on the internal HDD or image data received from a network-connected computer.

FIG. 2 is a functional block diagram schematically showing an essential internal configuration of the image forming apparatus 1. The image forming apparatus 1 is made up by including a control unit 10, the document feed section 6, the document reading section 5, the image forming section 12, an image memory 32, an HDD 92, a fixing section 13, a drive motor 70, the operating section 47, a facsimile communication section 71, and a network interface section 91. The same components as those of the image forming apparatus 1 shown in FIG. 1 will be designated by the same references and no further detailed explanation thereof will be given here. The document reading section 5, the image forming section 12, and the operating section 47 are respective examples of the image reading section, the image forming section, and the operating section which are defined in What is claimed is.

The document feed section 6 includes the document width sensor 8 configured to detect the dimension (document width W) of an original document along the main scanning direction on the document loading table 7. The document width sensor 8 sends to a control section 100 information about the document width W of the original document placed on the document loading table 7. The document width sensor 8 is an example of the document width detecting section defined in What is claimed is.

The document reading section 5 is under control of the control section 100 constituting an element of the control unit 10 and includes the reader 163 (see FIG. 1) including a lighting part, a CCD sensor, and so on. The document reading section 5 is configured to read a document image from an original document by irradiating the original document with light using the lighting part and receiving the reflected light on the CCD sensor.

The image memory 32 provides a region for temporarily storing image data of the original document acquired by reading by the document reading section 5 and temporarily saving data to be printed by the image forming section 12. The HDD 92 is a large storage device capable of storing image data and so on of original documents acquired by the document reading section 5.

The drive motor 70 is a drive source for applying a rotary drive force to various rotary members of the image forming section 12, a conveyance roller pair 19, and other rotary members. The facsimile communication section 71 includes a coding/decoding section, a modulation/demodulation section, an NCU (network control unit), and so on, all of which are not illustrated, and performs facsimile communication using a public telephone network.

The network interface section 91 is made up by including a communication module, such as a LAN (local area network) board, and is configured to transfer various data to and from external devices 20, such as personal computers, in a local area or on the Internet via a LAN or the like connected to the network interface section 91.

The control unit 10 is made up by including a CPU (central processing unit), a RAM (random access memory), a ROM (read only memory), and a dedicated hardware circuit and includes the control section 100, a document width calculating section 101, and a copy condition readout section 102. The control section 100, the document width calculating section 101, and the copy condition readout section 102 are respective examples of the control section, the document width detecting section, and the copy condition readout section which are defined in What is claimed is.

Furthermore, the control unit 10 functions as the control section 100, the document width calculating section 101, and the copy condition readout section 102 by operating in accordance with an operation control program installed on the HDD 92. However, each of the control section 100, the document width calculating section 101, and the copy condition readout section 102 may not be implemented by the operation of the control unit 10 in accordance with the operation control program but may be constituted by a hardware circuit. Hereinafter, the same applies to the other embodiments unless otherwise stated.

The control section 100 governs the overall operation control of the image forming apparatus 1.

The document width calculating section 101 is configured to calculate the dimension (document width W) of the original document to be copied along the main scanning direction based on the output from the document width sensor 8. In other words, the dimension (document width W) of the original document to be copied along the main scanning direction is detected by the document width calculating section 101 and the document width sensor 8. The document width calculating section 101 and the document width sensor 8 constitute an example of the document width detecting section defined in What is claimed is.

The copy condition readout section 102 is configured to read out, from a copy condition database DB to be described later, copy conditions associated with the document width W calculated by the document width calculating section 101.

FIGS. 3A and 3B are tables showing examples of a copy condition database DB which is formed in the RAM constituting a component of the control unit 10 of the image forming apparatus 1 and in which copy conditions depending on the document size are stored in association with the document width. A copy condition database DB1 shown in FIG. 3A is an example of a state where data values (default values) preset by a designer, a system administrator or the like are stored, while a copy condition database DB2 shown in FIG. 3B is an example of a state where data values modified by an operator are stored. A storage section (the RAM in this embodiment) containing the copy condition database DB1, DB2 is an example of the copy condition storage section defined in What is claimed is.

The copy condition database DB1, DB2 contains, for each document width (a range of minimum to maximum values), a modification flag indicating the presence or absence of modification from the default value (initial value) of any copy condition and some copy conditions (including magnification, density, and sheet size).

For example, it can be seen from the copy condition database DB1 shown in FIG. 3A that in association with an original document having a document width ranging from "211 to 297 mm" copy conditions indicating a magnification of "100%", a density of "normal", and a sheet size of "A3" are stored and that these copy conditions are default values because the modification flag is "0".

The operator can be free to set the copy conditions depending on the size of original document through the operation of the operating section 47. When receiving an operator's request to set the copy conditions depending on the size of original document, the control section 100 allows the display 473 to display, for example, such an operating screen D1 as shown in FIG. 4A. When the operator enters a document width (a range of minimum to maximum values) and sets the copy conditions (magnification, density, and sheet size) through the operating screen D1 using a touch panel function provided in the operating section 47 and the display 473, the control section 100 allows the copy condition database DB2 to store the entered copy conditions in association with the entered document width.

For example, suppose that the operator enters "250 mm" as the minimum value of the document width and "320 mm" as the maximum value thereof and sets the magnification at "66%", the density at "low", and the sheet size at "A4". In this case, it can be seen from the copy condition database DB1 shown in FIG. 3A that the entered document width range "250 to 320 mm" overlaps the already registered document width ranges "211 to 297 mm" and "298 mm or more". Therefore, as shown in FIG. 3B, the control section 100 excludes the newly entered document width range "250 to 320 mm" from the already registered document width ranges, updates these registered document width ranges to "211 to 249 mm" and "321 mm or more", and changes the modification flags for the updated document width ranges to "1".

Furthermore, the control section 100 allows the copy condition database DB2 to store the entered copy conditions (a magnification of "66%" a density of "low", and a sheet size of "A4") in association with the entered document width ranging from "250 mm" at minimum to "320 mm" at maximum and sets the modification flag for the document width to "1".

Although in this case a document width range is designated by setting minimum and maximum values, the way of designating the document width range is not limited to this. For example, the control section 100 may set a reference value and an allowable range from the reference value, such as "210 mm±20 mm", based on an operator's instruction.

Figure 5:
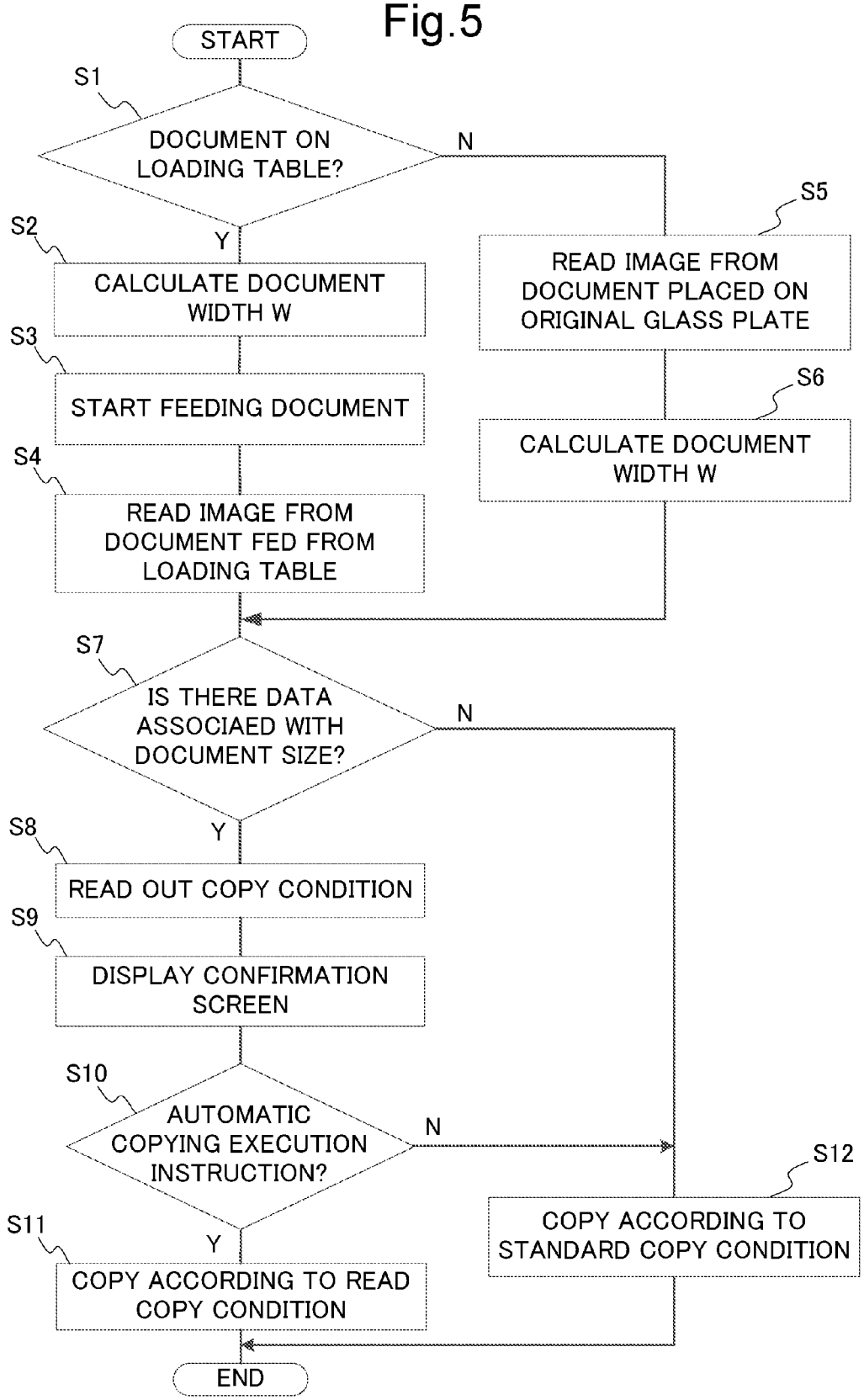
FIG. 5 is a flowchart showing an example of a procedure of an image forming operation on the image forming apparatus according to the first embodiment of the present disclosure.

Next, a description will be given of an example of a procedure of the image forming operation on the image forming apparatus 1 according to the first embodiment of the present disclosure, with reference to a flowchart shown in FIG. 5. The operation in this case is an operation performed when an operator instructs through the operating section 47 to copy an original document placed on the document loading table 7 or an original document placed on the original glass plate 161.

First, the control section 100 determines whether or not any original document is placed on the document loading table 7, based on an output signal from the document width sensor 8 provided at the document loading table 7 (step S1). If the control section 100 determines that any original document is placed on the document loading table 7 ("YES" in step S1), the document width calculating section 101 calculates the document width W based on information about the document width output from the document width sensor 8 (step S2). Thereafter, the control section 100 allows the document feed section 6 to start feeding the original document into the image forming apparatus 1 (step S3) and allows the document reading section 5 to read the original document to acquire an image thereof (step S4). The way of determining whether or not any original document is placed on the document loading table 7 is not limited to the use of the document width sensor 8 and other mechanisms may be employed.

On the other hand, if in step S1 the control section 100 determines that no original document is placed on the document loading table 7 ("NO" in step S1), the control section 100 allows the document reading section 5 to read an original document placed on the original glass plate 161 to acquire an image thereof (step S5). Subsequently, the document width calculating section 101 calculates, from a document image indicated by image data acquired by reading by the document reading section 5, the dimension (document width W) of the original document along the main scanning direction based on the number of pixels in the main scanning direction in the document image (step S6).

The control section 100 determines, based on the information about the document width W detected by the document width sensor 8 or the document width calculating section 101, whether or not copy conditions associated with the document width W exist by searching for them, for example, in the copy condition database DB2 shown in FIG. 3B (step S7). If the control section 100 determines that copy conditions associated with the document width W exist ("YES" in step S7), the copy condition readout section 102 reads out the associated copy conditions from the copy condition database DB2 (step S8).

For example, if the calculated document width W is 262 mm, the copy condition readout section 102 reads out the copy conditions indicating a magnification of "66%", a density of "low", and a sheet size of "A4" from the copy condition database DB2 shown in FIG. 3B.

Next, based on the document image acquired by reading by the document reading section 5, the control section 100 allows the display 473 to display, as a preview, copy contents that will be presented if copying is performed according to the read copy conditions. Furthermore, the control section 100 also allows the display 473 to display a message prompting the operator to enter an instruction indicating whether or not to perform copying according to the read copy conditions, which will hereinafter also be referred to as an "automatic copying mode" (step S9). The display 473 is an example of the notifying section defined in What is claimed is.

The control section 100 determines whether or not the instruction entered from the operator into the operating section 47 is an automatic copying execution instruction to perform copying in the automatic copying mode (step S10). If the control section 100 determines that the instruction from the operator is the automatic copying execution instruction ("YES" in step S10), the control section 100 allows the image forming section 12 to form, based on the copying conditions read out by the copy condition readout section 102 in step S8, an image from image data acquired by the document reading section 5 and stored in the image memory 32. In other words, the control section 100 allows the image forming section 12 to copy the original document in the "automatic copying mode" (step S11).

On the other hand, if in step S10 the control section 100 determines that the response from the operator is "not perform copying according to the read copy conditions", that is, the instruction from the operator is not the automatic copying execution instruction ("NO" in step S10), the control section 100 allows copying of the original document according to the predetermined standard copy conditions (step S12).

Also if in step S7 the control section 100 determines that no copy conditions associated with the size of the original document exist ("NO" in step S7), the control section 100 allows copying of the original document according to the predetermined standard copy conditions (step S12).

As thus far described, in the first embodiment, the copy condition database DB2 stores copy conditions for each size of original document in association with the dimension (document width) of the original document to be copied along the main scanning direction, the copy condition readout section 102 reads out, based on the document width, the copy conditions for the size of the original document to be copied from the copy condition database DB2, and the control section 100 allows the image forming section 12 to form an image acquired by the document reading section 5 on a recording paper sheet according to the read copy conditions.

As described above, in the first embodiment, copying is performed according to the copy conditions associated with the document width. Therefore, even if the original document is not of any standard size for prints, such as A4 (210 mm×297 mm) or B5 (182 mm×257 mm), but of an irregular size, copying in the "automatic copying mode" according to the document size can be performed, without manual entry of copy conditions from the operator, according to the copy conditions associated with the detected document width.

Furthermore, since whether or not to perform copying in the "automatic copying mode" is determined according to the operator's instruction, it can be prevented that copying in the "automatic copying mode" not desired by the operator is performed. Moreover, since a preview is displayed, the operator can easily select whether or not to perform copying in the "automatic copying mode". Alternatively, it is also possible to omit the processing in step S10 and perform copying in the "automatic copying mode" without the operator's instruction. This alternative is also an embodiment of the present disclosure.

In another embodiment, it is possible that the control section 100 allows the display 473 to display a copy condition modifying screen prompting the operator to modify the copy conditions during display of a preview in step S9, accepts an operator's instruction to modify the copying conditions through the operating section 47, modifies the copying conditions based on the operator's instruction, and allows copying in the "automatic copying mode".

For example, in a general image forming apparatus, when the size of an original document detected by the document size detecting section is the aforementioned standard size, such as A3 or A4, copying can be performed according to the above-described print setting items. However, when the original document is of an irregular size, the general image forming apparatus cannot copy the original document according to the preset print setting items.

Unlike the general image forming apparatus, in the above embodiment of the present disclosure, even if an original document to be copied is of an irregular size, it can be copied according to copy conditions preset in association with the document size.

Figure 6:
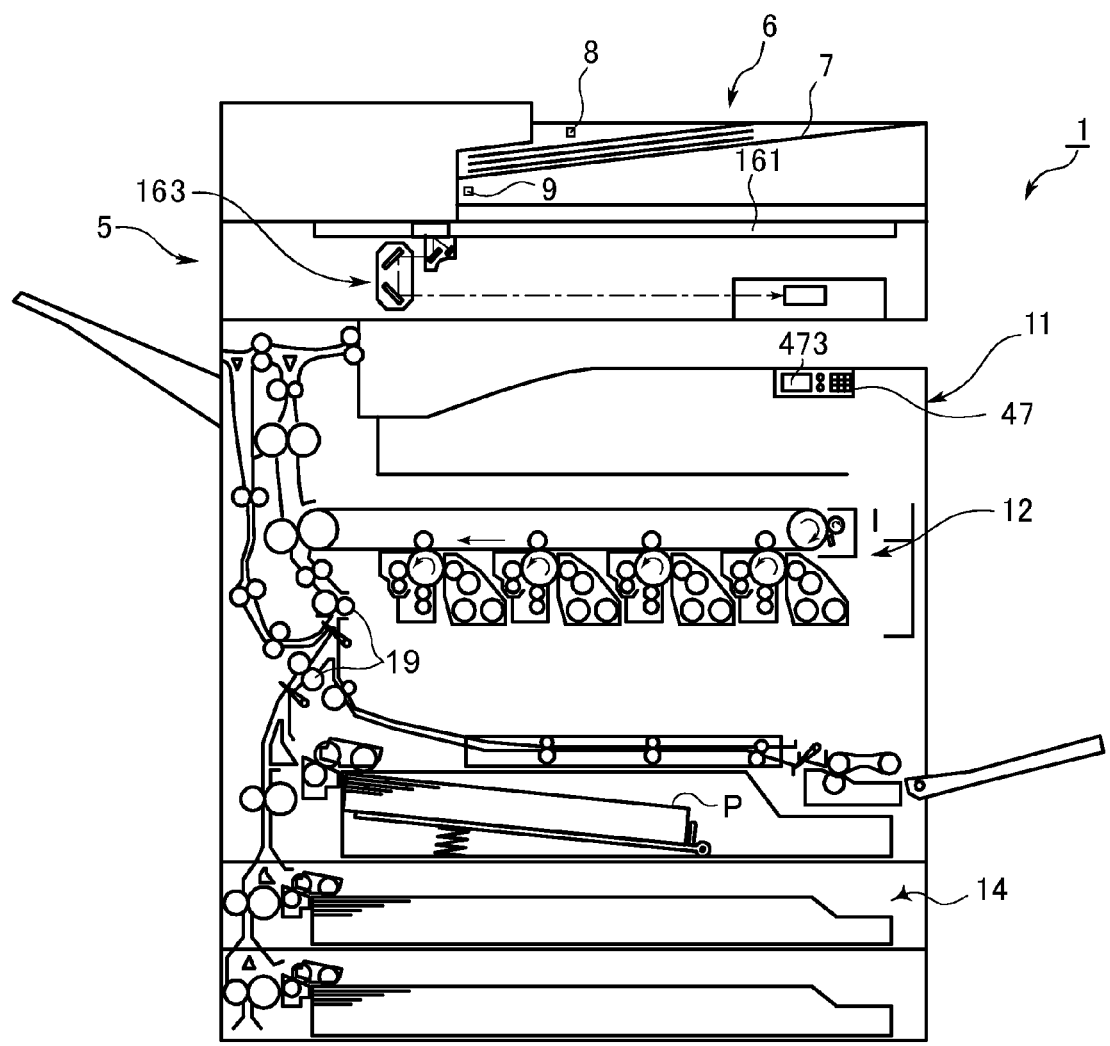
FIG. 6 is a schematic, partial cross-sectional front view showing the structure of an image forming apparatus according to a second embodiment of the present disclosure.

FIG. 6 is a schematic, partial cross-sectional front view showing the structure of an image forming apparatus according to a second embodiment of the present disclosure. The same components as those of the image forming apparatus 1 according to the first embodiment shown in FIG. 1 will be designated by the same references and no further detailed explanation thereof will be given here.

The description in the first embodiment has been given of the case where copying is performed according to the copy conditions depending on the dimension (document width W) of the original document along the main scanning direction. However, the second embodiment is different from the first embodiment in that copying is performed according to the copy conditions depending on not only the dimension (document width W) of the original document along the main scanning direction but also the dimension (document length L) of the original document along the sub-scanning direction.

A document feed section 6 is made up by including a document loading table 7 on which original documents are to be placed, a document width sensor 8 provided at the above-described document guide for aligning the width positions of the original documents on the document loading table 7 with each other and configured to detect the document width W, and a document length sensor 9 provided at a portion of the document loading table 7 downstream of the leading ends of the original documents in the direction of conveyance on the document loading table 7 and configured to detect whether or not any original document is placed on the document loading table 7. The document length sensor 9 is an example of the document length detecting section defined in What is claimed is.

When any original document exists at the location of the document length sensor 9, the document length sensor 9 outputs an ON signal to a document length calculating section 104 to be described hereinafter. When no original document exists at the location of the document length sensor 9, the document length sensor 9 outputs an OFF signal.

FIG. 7 is a functional block diagram schematically showing an essential internal configuration of the image forming apparatus 1 according to the second embodiment of the present disclosure. The same components as in the functional block diagram showing the essential internal configuration of the image forming apparatus 1 according to the first embodiment shown in FIG. 2 will be designated by the same references and no further detailed explanation thereof will be given here.

The document feed section 6 includes, as described above, the document width sensor 8 and the document length sensor 9 and is configured to output to the control unit 10 information about the document width W and document length L of an original document placed on the document loading table 7.

FIGS. 8A and 8B are tables showing examples of a copy condition database DB which is formed in the RAM constituting a component of the control unit 10 of the image forming apparatus 1 and in which copy conditions depending on the document size are stored in association with the document size (document width and document length). A copy condition database DB3 shown in FIG. 8A is an example of a state where data values (default values) preset by a designer, a system administrator or the like are stored, while a copy condition database DB4 shown in FIG. 8B is an example of a state where data values modified by an operator are stored. A storage section (the RAM in this embodiment) containing the copy condition database DB3, DB4 is an example of the copy condition storage section defined in What is claimed is.

The copy condition database DB3, DB4 contains, for each combination of a document width (a range of minimum and maximum values) and a document length (a range of minimum and maximum values), a modification flag indicating the presence or absence of modification from the default value (initial value) of any copy condition and some copy conditions (including magnification, density, and sheet size).

For example, it can be seen from the copy condition database DB3 shown in FIG. 8A that in association with an original document having a document width range from "211 to 297 mm" and a document length range from "0 to 299 mm" copy conditions indicating a magnification of "100%", a density of "normal", and a sheet size of "A3" are stored and that these copy conditions are default values because the modification flag is "0".

The operator can be free to set the copy conditions depending on the size of original document through the operation of the operating section 47. When receiving an operator's request to set the copy conditions depending on the size of original document, the control section 100 allows the display 473 to display an operating screen D2 shown as an example in FIG. 4B. When the operator enters a document width (a range of minimum to maximum values) and a document length (a range of minimum to maximum values) and sets the copy conditions (magnification, density, and sheet size) through the operating screen D2 using a touch panel function provided in the operating section 47 and the display 473, the control section 100 allows the copy condition database DB4 to store the entered copy conditions in association with the entered document width and document length.

The document length calculating section 104 is configured to calculate the document length L based on the time when the document length sensor 9 outputs an ON signal and the rate of conveyance of an original document by the document feed section 6. The document length calculating section 104 is an example of the document length detecting section defined in What is claimed is.

Figure 9:
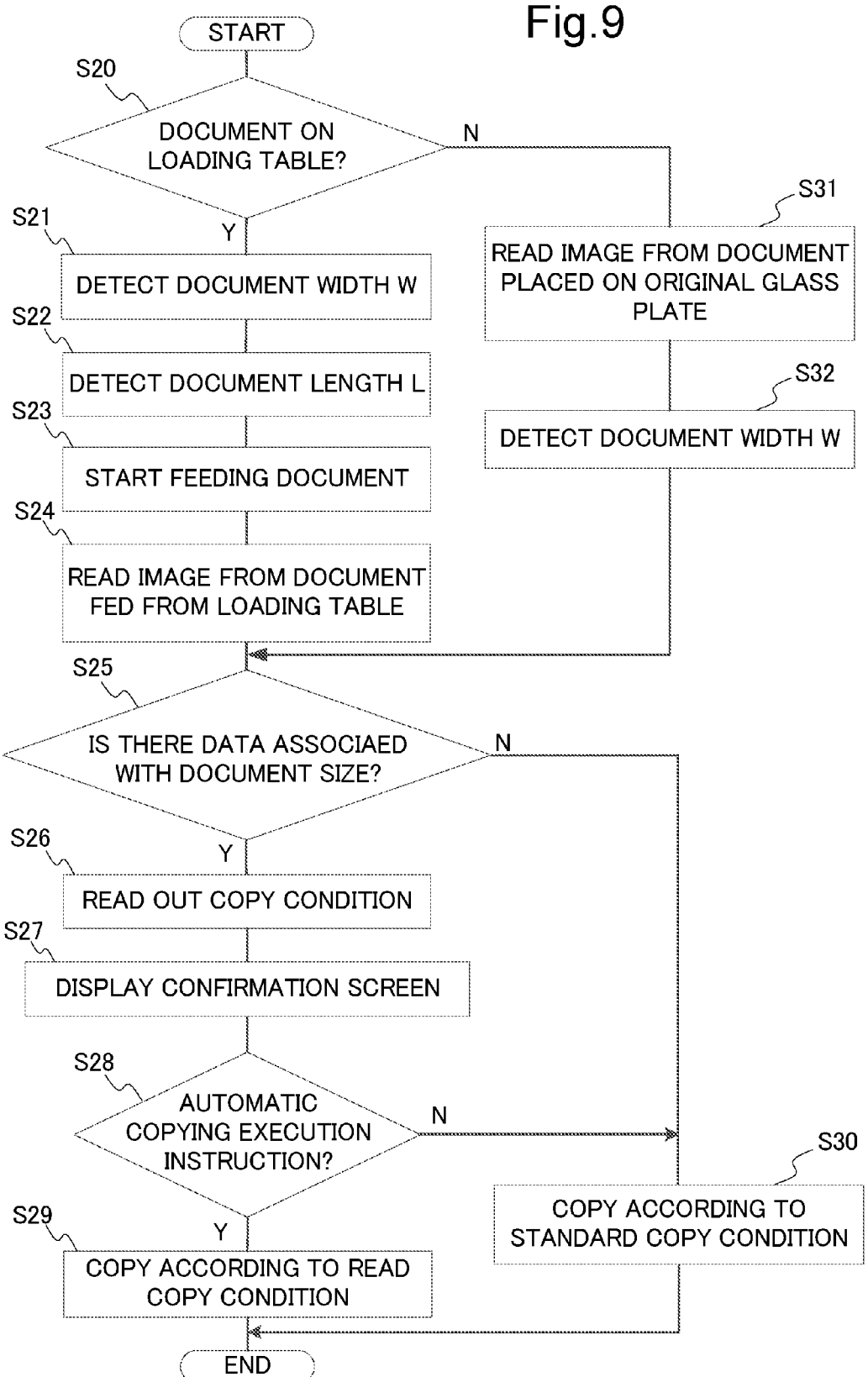
FIG. 9 is a flowchart showing an example of a procedure of an image forming operation on the image forming apparatus according to the second embodiment of the present disclosure.

Next, a description will be given of an example of a procedure of an image forming operation on the image forming apparatus 1 according to the second embodiment of the present disclosure, with reference to a flowchart shown in FIG. 9. The operation in this case is an operation performed when an original document placed on the document loading table 7 is copied. Further description of the same processing steps as in the first embodiment shown in FIG. 5 will not be given here.

First, the document width calculating section 101 of the control unit 10 calculates the document width W based on the output from the document width sensor 8 (step S21) and the document length calculating section 104 calculates the document length L based on the output from the document length sensor 9 (step S22). Thereafter, the control section 100 allows the document feed section 6 to start feeding the original document into the image forming apparatus 1 (step S23) and allows the document reading section 5 to read the original document to acquire an image thereof (step S24).

The control section 100 determines, based on the calculated document width W document length L, whether or not copy conditions associated with the document size formed of the document width W and document length L exist by searching for them in the copy condition database DB4 shown in FIG. 8B (step S25). If the control section 100 determines that copy conditions associated with the document size exist ("YES" in step S25), the copy condition readout section 102 reads out the associated copy conditions from the copy condition database DB4 (step S26).

For example, if the document width W is 240 mm and the document length L is 290 mm, the copy condition readout section 102 reads out the copy conditions indicating a magnification of "100%", a density of "normal", and a sheet size of "A3", for example, from the copy condition database DB4 shown in FIG. 8B.

The subsequent steps S27 to S30 are performed in the same manner as in steps S9 to S12 shown in the first embodiment.

As thus far described, in the second embodiment, the copy condition database DB4 stores copy conditions for each size of original document in association with the document width of the original document to be copied along the main scanning direction and the document length of the original document to be copied along the sub-scanning direction, the copy condition readout section 102 reads out, based on the document width and document length, the copy conditions for the size of the original document to be copied from the copy condition database DB4, and the control section 100 allows the image forming section 12 to form an image acquired by the document reading section 5 on a recording paper sheet according to the read copy conditions.

As described above, in the second embodiment, copying is performed according to the copy conditions associated with the document width and document length. Therefore, copying in the "automatic copying mode" according to the document size can be performed more accurately.

The method for detecting the document size (document width W and document length L) is not limited to those described above and other methods may also be employed.

Next, a description will be given of detection of the document size when a plurality of original documents are placed on the document loading table 7. When all the original documents on the document loading table 7 have the same document width, the document size can be easily detected. However, when the original documents have different document widths, the document widths of all the original documents may not be able to be correctly detected by the document width detecting section provided at the document guide on the document loading table 7.

For example, when an original document of B4 (257 mm×364 mm) is put on top of an original document of A3 (297 mm×420 mm), it is not possible to detect the document width of B4 smaller than that of A3 from the output of the document width sensor 8.

Figure 10A:
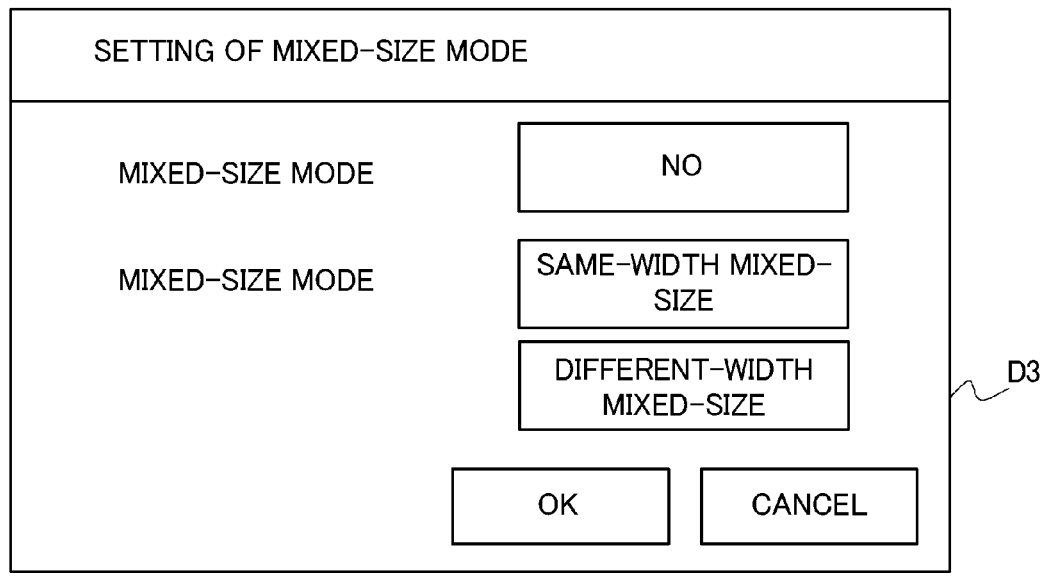
FIGS. 10A and 10B are views showing examples of operating screens.

To cope with this, when receiving an operator's request to set a mixed document size mode (hereinafter referred to as a mixed-size mode) through the operating section 47, the control section 100 allows the display 473 to display an operating screen D3 shown as an example in FIG. 10A. When the operator specifies the mixed-size mode (a same-width mixed-size mode or a different-width mixed-size mode) through the operating screen D3 using a touch panel function provided in the operating section 47 and the display 473, the control section 100 allows the detection of the document length depending on the mode specified by the operator.

For example, when determining that the same-width mixed-size mode has been set by the operator, the control section 100 allows the document width sensor 8 to detect, during reading of a plurality of original documents by the document reading section 5, the document width of only the first of the plurality of original documents. In reading out the copy conditions for each of the plurality of original documents to be read, the copy condition readout section 102 uses the detected document width of the first original document as the document widths of all of the plurality of original documents.

On the other hand, when determining that the different-width mixed-size mode has been set by the operator, the control section 100 allows the document width sensor 8 to detect, during reading of a plurality of original documents by the document reading section 5, the document widths of all of the plurality of original documents. In reading out the copy conditions for each of the plurality of original documents to be read, the copy condition readout section 102 uses the detected document width of each original document to read out the copy conditions.

Figure 10B:
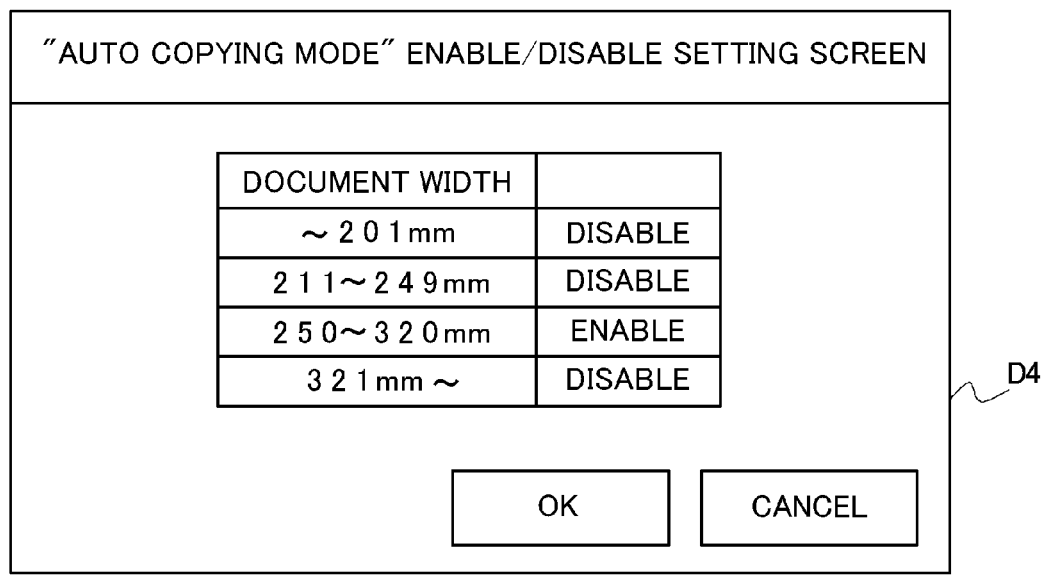

In still another embodiment, the control section 100 allows the display 473 to display, for example, such an operating screen D4 as shown in FIG. 10B. The operator may operate the operating section 47 so that the control section 100 accepts, through the operating screen D4, an operator's instruction for setting enablement or disablement of copying in the "automatic copying mode" for each document width desired by the operator, using a touch panel function provided in the operating section 47 and the display 473. According to the operator's instruction, the control section 100 may allow or disallow copying in the "automatic copying mode" to be performed.

Thus, as described previously, when a plurality of original documents having different sizes are placed on the document loading table 7, copying in the "automatic copying mode" can be performed only for those having a document width desired by the operator.

Next, a description will be given of an image forming operation according to still another embodiment of the present disclosure.

In the above embodiments, the processing for determining whether or not to perform copying in the "automatic copying mode" (the processing performed in steps S9 and S10 shown in FIG. 5 and the processing performed in steps S27 and S28 shown in FIG. 9) are executed every time copying is performed. However, the control section 100 may execute this processing only if a confirmation condition is satisfied. Examples of the confirmation condition include the following Conditions 1 and 2.

<Condition 1> The operator has already set copy conditions particularly for the original document to be copied.

In this case, since the operator has already set copy conditions particularly for that original document, it can be assumed that the operator desires to copy that original document in a mode other than the "automatic copying mode".

<Condition 2> The operator has already modified the setting for the document size of the original document to be copied.

If the operator has already modified the setting for the document size of that original document, it can be assumed that the operator does not desire to copy that original document in the "automatic copying mode".

Figure 11:
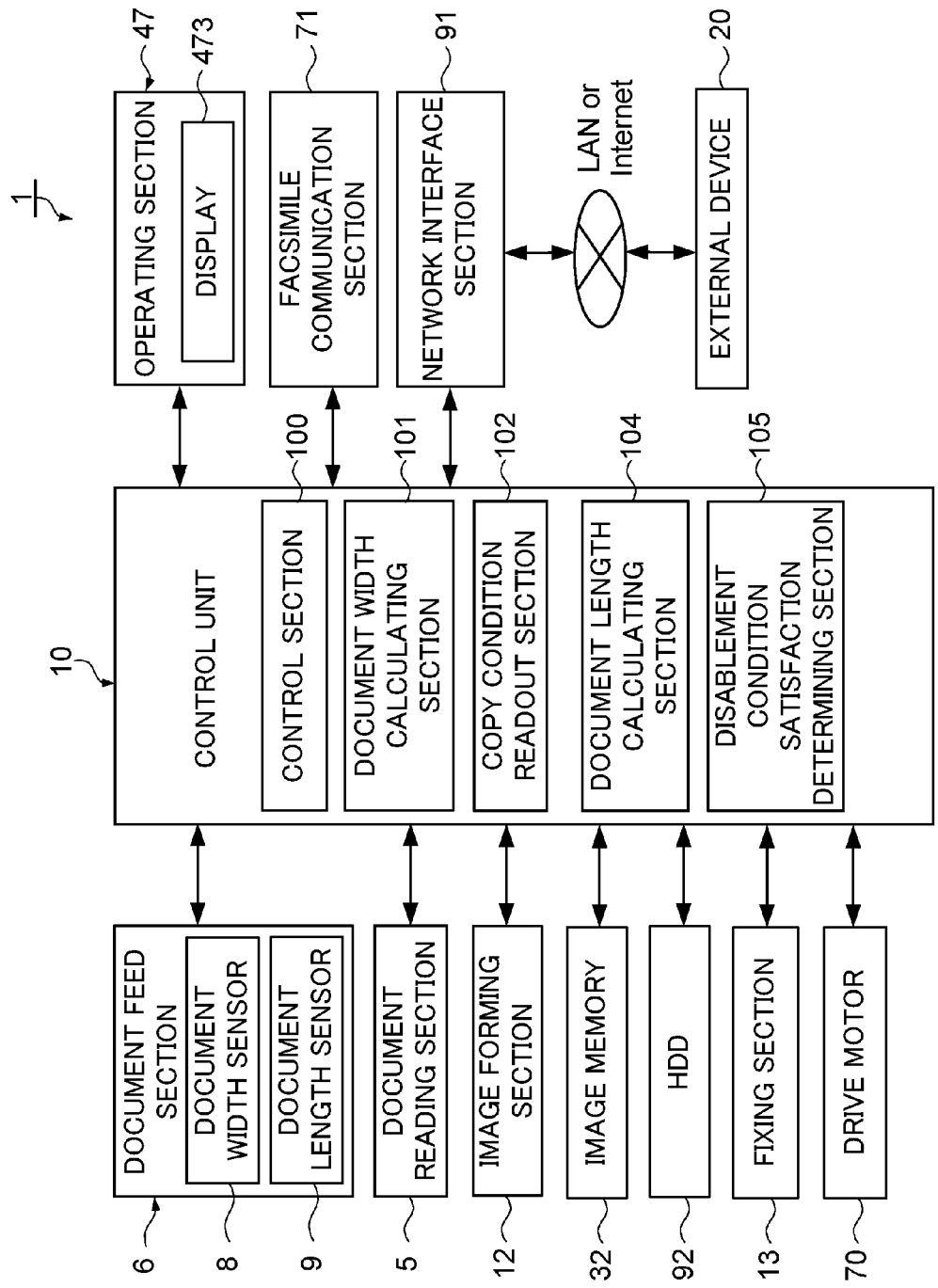
FIG. 11 is a functional block diagram schematically showing an essential internal configuration of an image forming apparatus according to a third embodiment of the present disclosure.

Furthermore, a description will be given of an image forming operation according to still another embodiment of the present disclosure. In this embodiment, as shown in FIG. 11, the control unit 10 includes a disablement condition satisfaction determining section 105 configured to determine whether or not a disablement condition for disabling copying in the "automatic copying mode" is satisfied. When the disablement condition satisfaction determining section 105 determines that the disablement condition is satisfied, the control section 100 does not perform copying in the "automatic copying mode".

The disablement condition satisfaction determining section 105 is an example of the disablement condition satisfaction determining section defined in What is claimed is. The function of the disablement condition satisfaction determining section 105 can be implemented by the operation of the control unit 10 in accordance with an operation control program installed on the HDD 92. Examples of the disablement condition include the following Conditions 1 to 3.

<Condition 1> The copy conditions read out from the copy condition database DB1 to DB4 have been modified from the data values (default values) preset by a designer, a system administrator or the like.

In this case, the disablement condition satisfaction determining section 105 determines whether or not the copy conditions have been modified from the default values, for example, from the modification flag stored in the copy condition database DB1 to DB4.

<Condition 2> The operator has already set copy conditions particularly for the original document to be copied.

<Condition 3> The operator has already selected disablement of copying in the "automatic copying mode".

The present disclosure is not limited to the above embodiments and can be modified in various ways. Although the description of the above embodiments is given taking a color multifunction peripheral as an example of the image forming apparatus according to the present disclosure, the example is merely illustrative and the image forming apparatus may be any other image forming apparatus, including a black-and-white multifunction peripheral and other electronic devices, such as a printer, a copier, and a facsimile machine.

Figure 12:
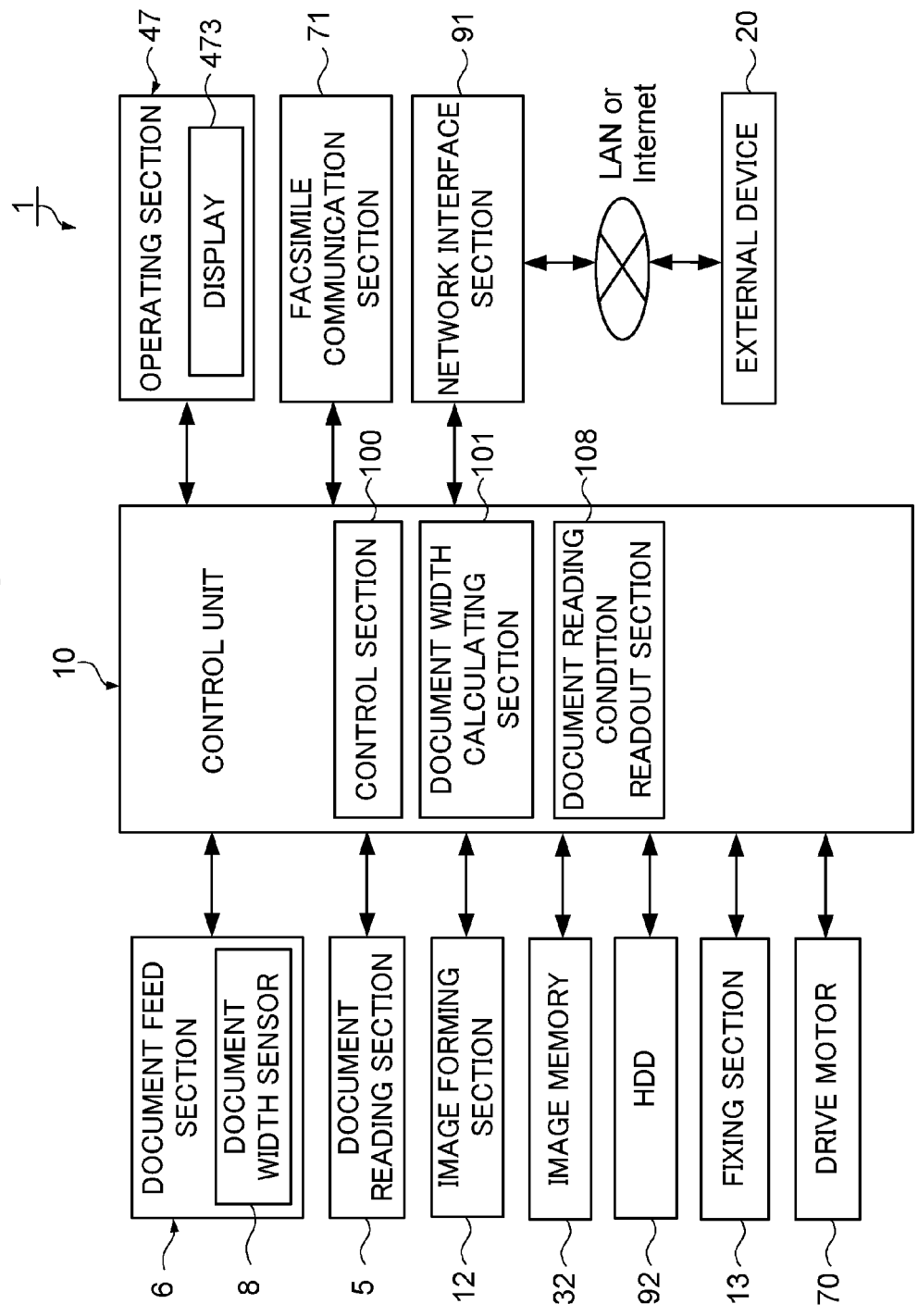
FIG. 12 is a functional block diagram schematically showing an essential internal configuration of an image forming apparatus according to a fourth embodiment of the present disclosure.

Although the description in the above embodiments has been given of the image forming apparatus and the copy conditions to be applied thereto, it goes without saying that the same techniques are applicable to a document reading apparatus and document reading conditions to be applied thereto. FIG. 12 is a functional block diagram schematically showing an essential internal configuration of a document reading apparatus according to a fourth embodiment of the present disclosure.

The document reading apparatus as this fourth embodiment is applicable to the image forming apparatus 1 as shown in FIG. 12. For example, the image forming apparatus 1 is an example of the document reading apparatus as the fourth embodiment. Provided in this embodiment are a document reading condition storage section (not shown) and a document reading condition readout section 108 in place of the copy condition readout section 102 shown in the first to third embodiments. In the fourth embodiment, document reading conditions are stored in a document reading condition database (document reading condition storage section) provided in the RAM constituting a component of the control unit 10. The document reading condition readout section 108 is configured to read out, from the document reading condition database, document reading conditions which are associated with the document width W calculated by the document width calculating section 101 and are to be used by the document reading section 5. Examples of the document reading conditions include a reading resolution, whether to read a black-and-white document or a color document, and a document type (characters or photographs).

The operations and functions of the document reading apparatus as the fourth embodiment can be explained by replacing the copy conditions in the description of the above embodiments with the document reading conditions.

For example, the control section 100 determines, based on the information about the document width W detected by the document width sensor 8 or the document width calculating section 101, whether or not document reading conditions associated with the document width W exist by searching for them in the document reading condition database. If the control section 100 determines that document reading conditions associated with the document width W exist, the document reading condition readout section 108 reads the associated document reading conditions from the document reading condition database.

The control section 100 allows the document reading section 5 to read the original document according to the document reading conditions. Furthermore, the control section 100 allows the image forming section 12 to form an image of the original document acquired by reading the original document and allows a storage region of the HDD 92 or the like to store the image.

The structures, configurations, and processing shown in the above embodiments with reference to FIGS. 1 to 12 are merely illustrative of the present disclosure and the present disclosure is not intended to be limited to the above structures, configurations, and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
a copy condition storage section configured to store a copy condition depending on a size of an original document to be copied, with the copy condition associated with at least a document width of the original document along a main scanning direction of the original document;
a document width detecting section configured to detect the document width of the original document to be copied along the main scanning direction of the original document to be copied;
a copy condition readout section configured to read out, from the copy condition storage section, the copy condition associated with the document width detected by the document width detecting section;
an image forming section configured to form an image on a recording paper sheet;
an image reading section configured to read the original document to be copied, thus acquiring an image of the original document; and
a control section configured to allow the image forming section to form the image acquired by the image reading section on the recording paper sheet according to the copy condition read out by the copy condition readout section,
wherein the image forming apparatus is capable of selectively setting a same-width mixed-size mode or a different-width mixed-size mode,
when an operator sets the image forming apparatus in the same-width mixed-size mode and a plurality of original documents are to be read by the image reading section, the document width detecting section detects the document width of only the first of the plurality of original documents to be read and the copy condition readout section reads out the copy condition associated with the detected document width of the first original document as the copy condition for all of the plurality of original documents to be read, and
when the operator sets the image forming apparatus in the different-width mixed-size mode and a plurality of original documents are to be read by the image reading section, the document width detecting section detects the document widths of all of the plurality of original documents to be read and the copy condition readout section reads out the respective copy conditions associated with the document widths of all of the plurality of original documents to be read from the copy condition storage section.

2. An image forming apparatus comprising:
a copy condition storage section configured to store a copy condition depending on a size of an original document to be copied, with the copy condition associated with at least a document width of the original document along a main scanning direction of the original document;
a document width detecting section configured to detect the document width of the original document to be copied along the main scanning direction of the original document to be copied;
a copy condition readout section configured to read out, from the copy condition storage section, the copy condition associated with the document width detected by the document width detecting section;
an image forming section configured to form an image on a recording paper sheet;

an image reading section configured to read the original document to be copied, thus acquiring an image of the original document;

a control section configured to allow the image forming section to form the image acquired by the image reading section on the recording paper sheet according to the copy condition read out by the copy condition readout section; and an operating section configured to selectively accept, from an operator, either one of an execution instruction to allow the image reading section and the image forming section to perform operations according to the copy condition read out by the copy condition readout section and a non-execution instruction to disallow the image reading section and the image forming section to perform the operations, wherein when the operating section accepts the execution instruction, the control section allows the image reading section and the image forming section to perform the operations according to the copy condition, and when the operating section accepts the non-execution instruction, the control section allows the image reading section and the image forming section to perform operations according to a predetermined standard copy condition, the apparatus further comprising a notifying section configured to notify the operator of a message prompting entry of an instruction indicating whether or not to allow the image reading section and the image forming section to perform the operations according to the copy condition read out by the copy condition readout section, wherein when the control section determines that a predetermined confirmation condition is satisfied, the control section allows the notifying section to notify the operator of the message, and the confirmation condition includes at least one of:

a condition that the operator has set a copy condition particularly for the original document to be copied; and a condition that the operator has operated the operating section to modify a setting for the size of the original document to be copied.

3. An image forming apparatus comprising:

a copy condition storage section configured to store a copy condition depending on a size of an original document to be copied, with the copy condition associated with at least a document width of the original document along a main scanning direction of the original document;

a document width detecting section configured to detect the document width of the original document to be copied along the main scanning direction of the original document to be copied;

a copy condition readout section configured to read out, from the copy condition storage section, the copy condition associated with the document width detected by the document width detecting section;

an image forming section configured to form an image on a recording paper sheet;

an image reading section configured to read the original document to be copied, thus acquiring an image of the original document;

a control section configured to allow the image forming section to form the image acquired by the image reading section on the recording paper sheet according to the copy condition read out by the copy condition readout section; and a disablement condition satisfaction determining section configured to determine whether or not a disablement condition for disabling copying according to the copy condition read out by the copy condition readout section is satisfied, wherein when the disablement condition satisfaction determining section determines that the disablement condition is satisfied, the control section disallows the image reading section and the image forming section to perform the copying according to the copy condition, and the disablement condition includes at least one of:

a condition that the copy condition has been modified from a default value; and a condition that an operator has selected disablement of the copying according to the copy condition.

* * * * *